United States Patent
Moteki et al.

(10) Patent No.: US 10,088,294 B2
(45) Date of Patent: Oct. 2, 2018

(54) CAMERA POSE ESTIMATION DEVICE AND CONTROL METHOD

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Toshiyuki Yoshitake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 352 days.

(21) Appl. No.: 15/098,039

(22) Filed: Apr. 13, 2016

(65) Prior Publication Data
US 2016/0364867 A1    Dec. 15, 2016

(30) Foreign Application Priority Data
Jun. 11, 2015 (JP) ................. 2015-118360

(51) Int. Cl.
*G06T 7/73* (2017.01)
*G01B 11/00* (2006.01)

(52) U.S. Cl.
CPC .............. *G01B 11/002* (2013.01); *G06T 7/73* (2017.01); *G06T 2207/30204* (2013.01); *G06T 2207/30244* (2013.01)

(58) Field of Classification Search
CPC .. G03B 37/02; G06T 7/80; G06T 7/73; G06T 2207/30244; G01B 11/002
See application file for complete search history.

(56) References Cited

U.S. PATENT DOCUMENTS

2008/0267453 A1* 10/2008 Avrahami .............. G06K 9/209
                                                         382/103
2011/0187815 A1    8/2011 Asami et al.
(Continued)

FOREIGN PATENT DOCUMENTS

JP    2011-130180    6/2011

OTHER PUBLICATIONS

Clipp, Brian, Christopher Zach, Jongwoo Lim, Jan-Michael Frahm, and Marc Pollefeys. "Adaptive, real-time visual simultaneous localization and mapping." In Applications of Computer Vision (WACV), 2009 Workshop on, pp. 1-8. IEEE, 2009.*
(Continued)

*Primary Examiner* — Carol Wang
(74) *Attorney, Agent, or Firm* — Fujitsu Patent Center

(57) ABSTRACT

A method includes determining movement of a camera from a first time point when a first image has been captured to a second time point when a second image has been captured, performing first estimation processing for estimating a position and pose of the camera in the second time point based on image data at the time of capturing, a past image captured in the past, and a past position and pose of the camera at a time point when the past image has been captured, when the movement is not a translational movement and a rotation movement around an optical direction, and performing a second estimation processing for estimating the position and pose based on a feature descriptor of a feature point extracted from the second image and a feature descriptor of a map point accumulated when the movement is the translational movement or the rotational movement.

20 Claims, 13 Drawing Sheets

(56) References Cited

U.S. PATENT DOCUMENTS

| | | | |
|---|---|---|---|
| 2013/0114851 A1* | 5/2013 | Foote | G06T 7/004 382/103 |
| 2013/0194418 A1* | 8/2013 | Gonzalez-Banos | G01C 11/02 348/135 |
| 2015/0103183 A1* | 4/2015 | Abbott | G01C 21/165 348/169 |
| 2017/0307380 A1* | 10/2017 | Revell | G06T 7/70 |

OTHER PUBLICATIONS

Williams, Brian, Mark Cummins, José Neira, Paul Newman, Ian Reid, and Juan Tardós. "An image-to-map loop closing method for monocular SLAM." In Intelligent Robots and Systems, 2008. IROS 2008. IEEE/RSJ International Conference on, pp. 2053-2059. IEEE, 2008.*

Del Bimbo, Alberto, Fabrizio Dini, Giuseppe Lisanti, and Federico Pernici. "Exploiting distinctive visual landmark maps in pan-tilt-zoom camera networks." Computer Vision and Image Understanding 114, No. 6 (2010): 611-623.*

P. Fite-Georgel, "Is there a Reality in Industrial Augmented Reality?", in Proceedings of 10th IEEE International Symposium on Mixed and Augmented Reality (ISMAR), pp. 201-210 (10 pages), 2011.

G. Klein et al., "Parallel Tracking and Mapping for Small AR Workspaces", in Proceedings of 6th IEEE and ACM International Symposium on Mixed and Augmented Reality, Nara (10 pages), 2007.

J. Straub et al., "Fast Relocalization for Visual Odometry Using Binary Features", in Proceedings of International Conference on Image Processing (ICIP), pp. 2548-2552 (5 pages), 2013.

D. G. Lowe, "Distinctive Image Features from Scale-Invariant Keypoints", International Journal of Computer Vision, vol. 60, No. 2, pp. 91-110 (20 pages), 2004.

R. I. Hartley, "In Defense of the Eight-Point Algorithm", IEEE Transactions on Pattern Analysis and Machine Intelligence, vol. 19, No. 6, pp. 580-593 (14 pages), 1997.

R. I. Hartley et al., "Triangulation", Computer Vision and Image Understanding, vol. 68, No. 2, pp. 146-157 (12 pages), 1997.

Z. Zhang, A Flexible New Technique for Camera Calibration, IEEE Transactions on Pattern Analysis and Machine Intelligence, vol. 22, No. 11, pp. 1330-1334 (5 pages), 2000.

V. Lepetit et al., "EPnP: An Accurate O(n) Solution to the PnP Problem", International Journal of Computer Vision, vol. 81, Issue 2, pp. 155-166 (12 pages), 2008.

P. H.S. Torr et al., "The Problem of Degeneracy in Structure and Motion Recovery from Uncalibrated Image Sequences", International Journal of Computer Vision, vol. 32, No. 1, pp. 27-44 (18 pages), 1999.

R. Hartley et al., "Multiple View Geometry in Computer Vision Second Edition", Cambridge University Press, Cambridge, U.K. pp. 122-123 (3 pages), 2003.

H. Kato et al., "Marker Tracking and HMD Calibration for a Video-based Augmented Reality Conferencing System" (IWAR), pp. 85-94 (10 pages), 1999.

* cited by examiner

FIG. 1

| | [TRANSLATION] OPTICAL AXIS DIRECTION | [TRANSLATION] DIRECTION PERPENDICULAR TO OPTICAL AXIS | [ON-THE-SPOT ROTATION] AROUND OPTICAL AXIS | [ON-THE-SPOT ROTATION] AROUND AXIS PERPENDICULAR TO OPTICAL AXIS | [TRANSLATION + ROTATION] |
|---|---|---|---|---|---|
| IMAGE-TO-IMAGE METHOD | × | × | △ | ○ | × |
| IMAGE-TO-MAP METHOD | ○ | ○ | ○ | △ | △ |

FIG. 2

| NUMBER | X[mm] | Y[mm] | Z[mm] | FEATURE AMOUNT |
|---|---|---|---|---|
| 1 | 126 | 59 | 329 | (0.264,⋯) |
| 2 | 314 | 193 | 289 | (0.822,⋯) |
| 3 | 212 | 49 | 315 | (0.652,⋯) |
| ... | ... | ... | ... | ... |
| 68 | -237 | -21 | 291 | (0.740,⋯) |

FIG. 3

| NUMBER | POSITION AND POSE | CAPTURED IMAGE |
|---|---|---|
| 1 | (0.24,0.84,0.96,245.0,313.9,23.8) | (24,46,⋯) |
| 2 | (0.15,0.90,0.23,93.3,163.0,73.2) | (25,44,⋯) |
| 3 | (0.64,0.45,0.12,132.8,77.3,61.8) | (22,40,⋯) |
| ... | ... | ... |
| 25 | (0.54,0.80,0.92,398.2,310.2,292.0) | (134,89,⋯) |

FIG. 5

| NUMBER | X[mm] | Y[mm] | Z[mm] | FEATURE AMOUNT | x[pixel] | y[pixel] |
|---|---|---|---|---|---|---|
| 1 | 126 | 59 | 329 | (0.264,⋯) | 82 | 254 |
| 2 | 314 | 193 | 289 | (0.822,⋯) | 231 | 90 |
| 3 | 212 | 49 | 315 | (0.652,⋯) | 186 | 256 |
| ... | ... | ... | ... | ... | ... | ... |
| 68 | -237 | -21 | 291 | (0.740,⋯) | 18 | 22 |

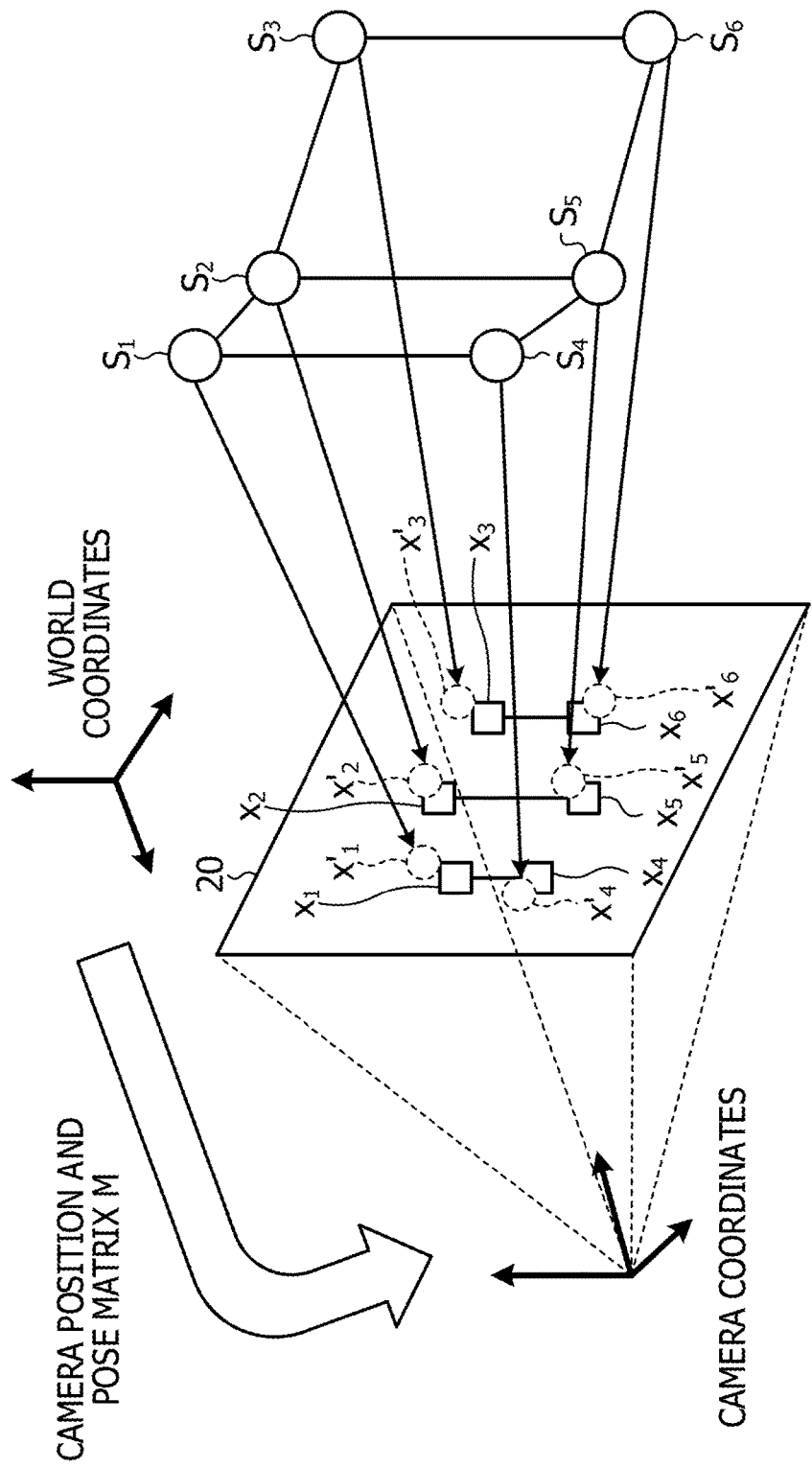

CAMERA POSE ESTIMATION DEVICE AND CONTROL METHOD

CROSS-REFERENCE TO RELATED APPLICATION

This application is based upon and claims the benefit of priority of the prior Japanese Patent Application No. 2015-118360, filed on Jun. 11, 2015, the entire contents of which are incorporated herein by reference.

FIELD

The embodiments discussed herein are related to a camera pose estimation device and others.

BACKGROUND

There are methods of obtaining a position and pose of a camera mounted on a personal computer (PC), a mobile terminal, and other devices. Furthermore, techniques are known that use the obtained position and pose of the camera to cause additional information to be superimposed on a captured image displayed on a screen of the PC or the mobile terminal in order to realize user work support.

As a conventional technique of estimating a position and pose of a camera from a screen from moment to moment, a method that uses a feature point included in an image is available, for example. With the conventional technique using a feature point, a three-dimensional coordinate map with respect to an object is created in advance, and a feature point present in the current image is associated with a group of points in the map every frame, whereby the position and pose of the camera is estimated.

FIG. 13 is a diagram explaining a conventional technique for obtaining a position and pose of a camera. In the example illustrated in FIG. 13, map points $S_1$ to $S_6$ are present. A map point $S_i$ is presented by expression (1). On an image 20, feature points $x_1$ to $x_6$ are present. A feature point $x_i$ is presented by expression (2) in a camera coordinate system. Map points projected on the captured image 20 are projected points $x_1'$ to $x_6'$. A projected point $x_i'$ is presented by expression (3) in a camera coordinate system.

$$S_i = (x, y, z) \quad (1)$$

$$x_i = (u, v) \quad (2)$$

$$x_i' = (u', v') \quad (3)$$

For example, with a conventional technique, a camera position and pose matrix M is calculated such that a sum of squares E calculated by expression (4) is the smallest, whereby a position and pose of a camera is obtained.

$$E = \sum_p |x_p' - x_p|^2 \quad (4)$$

At this time, when the user is performing an operation, the position and pose of the camera are frequently changed, and estimation of the position and pose of the camera is temporarily lost in some cases. For example, when the user turns the mobile terminal downward, the camera mounted on the mobile terminal also faces down. With this, feature points included in the object are not detected in the captured image of the camera, whereby detection of the position and pose of the camera is temporarily disabled.

When the camera is directed to the object again from the state in which the position and pose of the camera is not detected, processing for restarting the camera position and pose estimation processing is performed. This processing is referred to as relocalization processing. For the relocalization processing, a plurality of techniques are available. For example, the relocalization processing includes a technique using an image-to-image method and a technique using an image-to-map method. Furthermore, a technique that determines an pose change of an imaging device is also available (see Japanese Laid-open Patent Publication No. 2011-130180).

The image-to-image method will be described. The image-to-image method uses a keyframe in the relocalization processing. A keyframe is a piece of information in which a camera position and pose value is associated with a captured image of the camera at that time. By using a three-dimensional map acquired in advance, the user accumulates keyframes during the camera position and pose estimation. When the position and pose of the camera is lost, the image-to-image method searches for keyframes being the most similar to the current captured image of the camera, estimates a relative position and pose between the searched keyframes and the current camera, and thereby obtains the current position and pose of the camera. With the image-to-image method, the relocalization processing is performed using two images, as described above.

An advantage of the image-to-image method will be described. The image-to-image method enables high-speed relocalization processing.

The image-to-map method will be described. With the image-to-map method, a local feature descriptor for each feature point is used for relocalization processing. With the image-to-map method, feature points within the current captured image of the camera are associated with map points through matching of the local feature descriptors. With the image-to-map method, if a corresponding pair of three or more feature points and map points is able to be found, the current position and pose of the camera may be estimated by a perspective N-point (PnP) algorithm. The image-to-map method performs the relocalization processing by associating feature points within the captured image with map points as described above.

An advantage of the image-to-map method will be described. The image-to-map method enables estimation of the position and pose with less keyframes compared with the image-to-image method.

SUMMARY

According to an aspect of the invention, a method includes determining movement of a camera from a first time point when a first image has been captured to a second time point when a second image has been captured based on the first image and the second image captured by the camera, performing first estimation processing for estimating a position and pose of the camera in the second time point based on image data at the time of capturing, a past image captured in the past, and a past position and pose of the camera at a time point when the past image has been captured, when the movement is not a translational movement and a rotation movement around an optical direction, and performing a second estimation processing for estimating the position and pose of the camera at the second time point based on a feature descriptor of a feature point extracted from the second image and a feature descriptor of a map point accumulated in the past, when the movement is the translational movement or the rotational movement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram explaining an idea with respect to switching between an image-to-image method and an image-to-map method which has been designed by the inventor;

FIG. 2 is a diagram illustrating an example of a data structure of a three-dimensional map;

FIG. 3 is a diagram illustrating an example of a data structure of a keyframe table;

FIG. 5 is a diagram illustrating an example of a matching result;

FIG. 13 is a diagram explaining a conventional technique for obtaining a position and pose of a camera.

DESCRIPTION OF EMBODIMENTS

Figure 4:
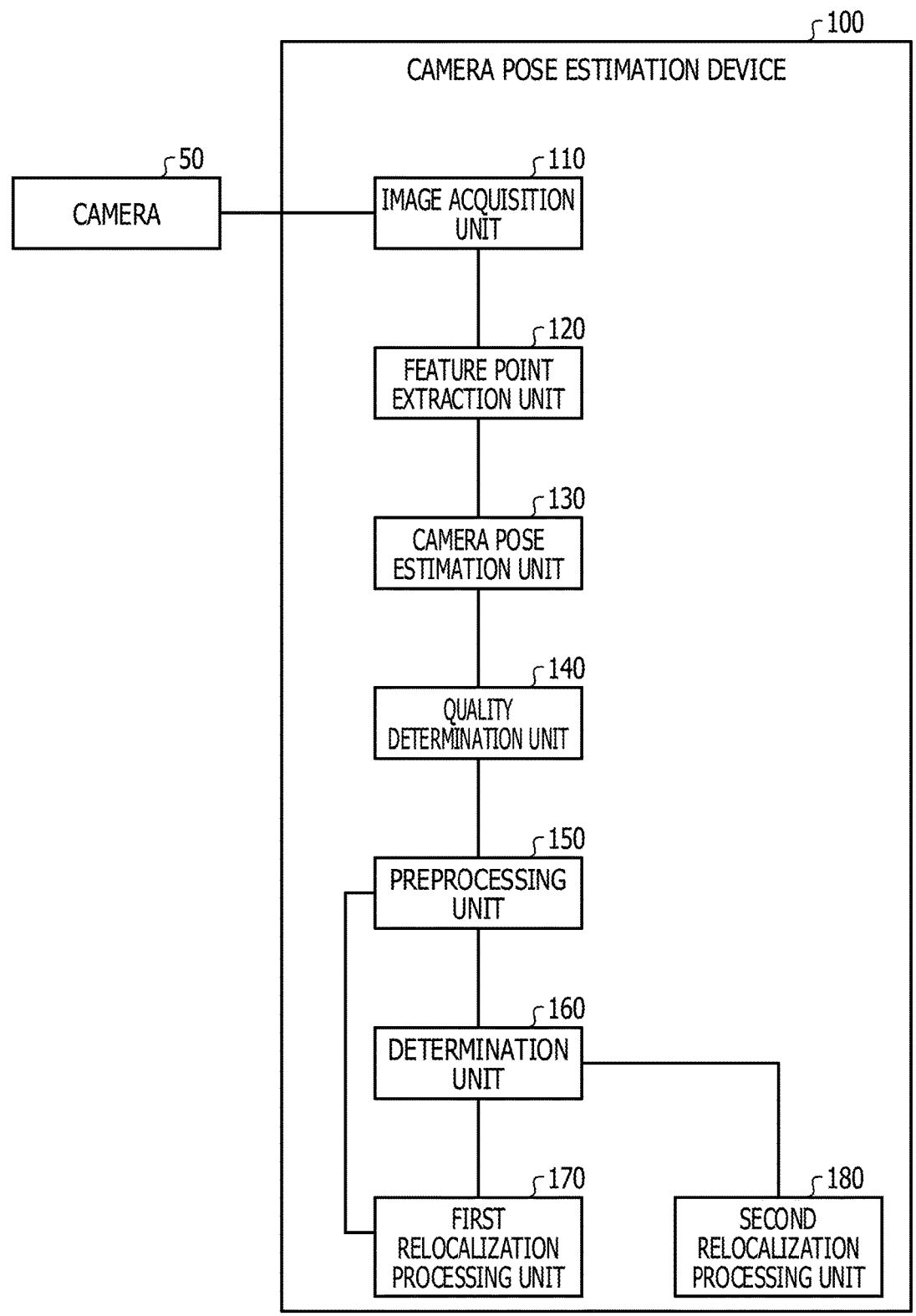
FIG. 4 is a functional block diagram illustrating a configuration of a camera pose estimation device according to an embodiment.

The conventional technique described above has a problem that the conventional technique is not able to accurately estimate a position and pose of a camera.

Firstly, a disadvantage of an image-to-image method will be described. With the image-to-image method, in order to improve accuracy of relocalization processing, the number of keyframes to be distributed has to be increased in advance so that uneven distribution thereof is reduced. When the user work support is assumed, a user who is not familiar with the image-to-image method performs high-level accumulation of keyframes. This is not very efficient.

Furthermore, the image-to-image method is not able to perform relocalization depending on the positional relation between the most similar keyframes and the current camera. The image-to-image method with which a relative pose is obtained from two images is only able to estimate a relative rotation motion of the camera and is not able to estimate a translational motion.

Next, a disadvantage of an image-to-map method will be described. With the image-to-map method, a higher processing cost is caused by the relocalization processing, compared with the case of the image-to-image method. For example, with the image-to-map method, extraction and matching of local feature descriptors are performed with respect to all keyframes, whereby the processing cost is increased.

Furthermore, the image-to-map method is not able to perform relocalization depending on the current positional relation of the camera. For example, with respect to non-affine invariant feature descriptors, matching of the feature descriptors fails unless the camera is in an oblique direction against the object.

As described above, each of the image-to-image method and the image-to-map method has its merits and demerits. Depending on the position and pose of the camera, it is hard to estimate the position and pose of the camera. For this reason, it is desired to estimate the position and pose of the camera in a manner corresponding to various positions and poses of the camera.

According to one aspect, a technique disclosed in an embodiment is for estimating a position and pose of a camera.

Embodiments of a camera pose estimation device, a camera pose estimation method, and a camera pose estimation program will be described below in details with reference to the drawings. It is noted that the present disclosure is not limited by these embodiments.

First Embodiment

FIG. 1 is a diagram explaining an idea with respect to switching between an image-to-image method and an image-to-map method which has been designed by the inventor. In FIG. 1, "circle" indicates that the corresponding method is able to estimate the position and pose of the camera, and "cross mark" indicates that the corresponding method is not able to estimate the position and pose of the camera. "Triangle" indicates that the corresponding method is able to estimate the position and pose of the camera with conditions.

For example, the image-to-image method does not correspond to a translational motion because only a relative rotation motion between past keyframes and the current camera position is estimated.

On the other hand, when only an on-the-spot rotation is included, the correspondence relation varies depending on whether the rotation is around the optical axis of the camera or around the axis perpendicular to the optical axis. Although rotation around the optical axis may be corresponded by the image-to-image method even in the case of a small amount of rotation, the image-to-map method is more suitable than the image-to-image method.

The image-to-image method is able to correspond to rotation around the axis perpendicular to the optical axis. However, with respect to the rotation around the axis perpendicular to the optical axis, the image-to-image method only corresponds to a very small descriptor of rotation unless the feature descriptor is affine invariant.

The image-to-image method does not correspond to a motion in which a translational movement and a rotation are integrated because the motion includes a translational movement. The image-to-map method is only able to correspond to a very small amount of rotation unless the feature descriptor is affine invariant.

In view of the matters described with reference to FIG. 1, a camera pose estimation device according to a first embodiment determines whether or not the camera motion includes a translational movement, and if the camera motion includes a translational movement, selects the image-to-map method to perform relocalization processing. The camera pose estimation device, if the camera motion does not include a translational movement, determines around what direction the on-the-spot rotation is mainly performed, and if the on-the-spot rotation is performed around the optical axis, uses the image-to-map method to perform relocalization processing. In other cases, the camera pose estimation device uses the image-to-image method to perform relocalization processing. With this, regardless of the positional relation between the position of the camera before the movement and that after the movement, the camera pose estimation device is able to estimate the position and pose of the camera and perform appropriate relocalization processing.

At this point, the camera pose estimation device according to the first embodiment creates in advance a three-dimensional map and a keyframe table for use in estimation of the position and pose of the camera. A method for creating a three-dimensional map and a method for creating a keyframe table will be described below in this order.

Processing for creating a three-dimensional map will be described. Before the estimation of the position and pose of the camera, the camera pose estimation device measures three-dimensional coordinates of natural feature points around the target device that uses an augmented reality (AR) function. The creation method will be described below. In the description below, the natural feature points in a three-dimensional space are denoted as map points as appropriate. Furthermore, map points on an image are denoted as feature points.

The camera pose estimation device captures two images from different viewpoints by using the camera. The camera pose estimation device extracts feature points corresponding to the map points from the two images, and performs matching of the feature points common in the two images. For example, the feature points are detected based on the fact that gradation variation is great in the vicinity of a noted point and the position of the noted point on the image is uniquely defined in accordance with the gradation variation.

For the extraction and matching of the feature points, processing such as SIFT, SURF, and ORB is used. For example, for the processing of SIFT, the processing described in D. G. Lowe, "Distinctive Image Features from Scale-Invariant Keypoints", *International Journal of Computer Vision*, Vol. 60, No. 2, pp. 91-110, 2004 may be performed.

The camera pose estimation device uses a matched pair of feature points to calculate a basic matrix based on an 8-point algorithm between the two images. The camera pose estimation device uses triangulation of the basic matrix and the feature points to acquire three-dimensional coordinates of the map points and thereby creates a three-dimensional map.

For example, the camera pose estimation device may use the processing described in R. I. Hartley, "In Defense of the Eight-point Algorithm", *IEEE Transactions on Pattern Analysis and Machine Intelligence*, Vol. 19, No. 6, pp. 580-593, 1997 as processing for the 8-point algorithm. The camera pose estimation device may use the processing described in R. I. Hartley et al., "Triangulation", *Computer Vision and Image Understanding*, Vol. 68, No. 2, pp. 146-157, 1997 as processing for triangulation.

FIG. 2 is a diagram illustrating an example of a data structure of a three-dimensional map. As illustrated in FIG. 2, the three-dimensional map associates a number, X, Y, Z, and a feature descriptor with one another. In FIG. 2, the number is a number for uniquely identifying a map point. As in the example illustrated in FIG. 2, 68 pieces of map points are included in the three-dimensional map. X, Y, Z indicate three-dimensional coordinates of the map points. The feature descriptors are feature descriptors of the feature points on the image that correspond to the map points. For example, the feature descriptors may be the values of pixels around the feature points. When the processing method described above is used, the first camera viewpoint becomes the origin of world coordinates as is.

Next, processing for creating a keyframe table will be described. In addition to the three-dimensional map, the camera pose estimation device also uses a three-dimensional map acquired in advance and calculates the position and pose of the camera with the method described below. The camera pose estimation device stores information that associates a captured image having been captured by the camera while the camera pose estimation is stable with the position and pose of the camera at the time point of capturing the captured image in the keyframe table as a keyframe. The camera pose estimation device adds a keyframe when conditions 1 to 3 described below are all satisfied.

A predetermined period of time has elapsed after the last time a keyframe is added . . . . (Condition 1)

The estimated value of the position and pose of the camera is high quality . . . . (Condition 2)

The Euclidean distance between the nearest keyframes is equal to or higher than a threshold . . . . (Condition 3)

The predetermined period of time in condition 1 is 660 ms, for example. The processing for determining whether or not the estimated value is high quality in condition 2 will be described later. The threshold in condition 3 is the same value as the value of the distance between two cameras in the three-dimensional map created in advance, for example.

FIG. 3 is a diagram illustrating an example of a data structure of a keyframe table. As illustrated in FIG. 3, this keyframe table associates a number, a position and pose, and a captured image with one another. In FIG. 3, the number is a number for uniquely identifying the keyframe. The position and pose indicates the position and the pose of the camera. The captured image is an image data captured by the camera. In the example illustrated in FIG. 3, 25 pieces of keyframes are included in the keyframe table.

For example, the position and pose of the camera is six-dimensionally represented (r1, r2, r3, t1, t2, t3). Out of these, (r1, r2, r3) represent the pose of the camera in the world coordinates. (t1, t2, t3) represent the position of the camera in the world coordinates.

Next, a configuration of the camera pose estimation device according to the first embodiment will be described. FIG. 4 is a functional block diagram illustrating a configuration of a camera pose estimation device according to the present embodiment. As illustrated in FIG. 4, a camera pose estimation device 100 is connected to a camera 50. The camera pose estimation device 100 includes an image acquisition unit 110, a feature point extraction unit 120, a camera pose estimation unit 130, and a quality determination unit 140. The camera pose estimation device 100 further includes a preprocessing unit 150, a determination unit 160, a first relocalization processing unit 170, and a second relocalization processing unit 180.

The camera 50 is a monocular red-green-blue (RGB) camera mounted on a PC or a mobile terminal. The camera 50 captures an image from an optional viewpoint and outputs the captured image to the image acquisition unit 110.

The image acquisition unit 110 is a processing unit that is connected to the camera 50 and acquires the captured image from the camera 50. The image acquisition unit 110 outputs the captured image to the feature point extraction unit 120.

The feature point extraction unit 120 is a processing unit that extracts a feature point from the captured image. For example, the feature point extraction unit 120 performs processing such as SIFT, SURF, and ORB and thereby extracts the feature points. The feature point extraction unit 120 outputs information of the feature points to the camera pose estimation unit 130. The information of the feature points includes two-dimensional coordinates and the feature descriptor of each feature point extracted from the captured image, for example.

The camera pose estimation unit 130 is a processing unit that performs matching between a feature point and a map point based on the information of the feature points acquired from the feature point extraction unit 120 and the three-dimensional map illustrated in FIG. 2 and estimates the position and pose of the camera 50 based on the result of the matching.

An example of processing for matching a map point and a feature point that is performed by the camera pose estimation unit 130 will be described. The camera pose estimation unit 130 uses the position and pose of the camera 50 that has been estimated last time to determine the map point in the three-dimensional map that the feature point corresponds to. The camera pose estimation unit 130 obtains coordinates with which the map points are projected on the captured image at the previous time by using expression (5). In the description below, the map points projected on the captured image are denoted as projection points as appropriate.

$$\begin{pmatrix} u \\ v \\ 1 \end{pmatrix} = A(R|t) \begin{pmatrix} X \\ Y \\ Z \\ 1 \end{pmatrix} \quad (5)$$

In expression (5), A is a matrix of 3 rows×3 columns and corresponds to an internal parameter of the camera 50. The user is to perform calibration of the camera 50 in advance based on Z. Zhang, "A Flexible New Technique for Camera Calibration", *IEEE Transactions on Pattern Analysis and Machine Intelligence*, Vol. 22, No. 11, pp. 1330-1334, 2000.

In expression (5), (R|t) is a matrix of 3 rows×4 columns integrating values obtained by converting the position and pose of the camera 50 that has been estimated last time into a rotation matrix R of 3 rows×3 columns and a translational vector t using Rodrigues' conversion formula presented in expression (6). (u, v) are two-dimensional coordinates of a projection point in a case where a map point is projected on the captured image. (X, Y, Z) are three-dimensional coordinates of each map point.

$$R = \cos\theta * I + (1 - \cos\theta) * rr^T + \sin\theta * \begin{bmatrix} 0 & -r_3 & r_2 \\ r_3 & 0 & -r_1 \\ -r_2 & r_1 & 0 \end{bmatrix} \quad (6)$$

In expression (6), I represents a unit matrix. θ is defined by expression (7). r is defined by expression (8).

$$\theta = \sqrt{r_1^2 + r_2^2 + r_3^2} \quad (7)$$

$$r = \begin{pmatrix} r_1 \\ r_2 \\ r_3 \end{pmatrix} \quad (8)$$

The camera pose estimation unit 130 calculates, with respect to each of the projection points, the distance thereof from the feature points on the captured image at the current time, which are present within a range of a certain threshold. The camera pose estimation unit 130 identifies the projection point and the feature point between which the distance is the smallest and defines the map point corresponding to the identified projection point and the feature point to be a pair. The camera pose estimation unit 130 repeatedly performs the above-described processing with respect to all the projection points and performs matching of the map points corresponding to the projection points and the feature points on the captured image at the current time. The threshold is set to 20 pixels, for example.

After the matching, the camera pose estimation unit 130 performs the processing for estimating the position and pose of the camera 50. When three or more pairs of the feature points and the map points are present, the camera pose estimation unit 130 uses a PnP algorithm to estimate the position and pose of the camera. For example, the camera pose estimation unit 130 may estimate the position and pose of the camera by using the PnP algorithm described in V. Lepetit et al., "EPnP: An Accurate O(n) Solution to the PnP Problem", *International Journal of Computer Vision*, Vol. 81, Issue 2, pp. 155-166, 2008.

Furthermore, the camera pose estimation unit 130 may estimate the position and pose of the camera 50 by using expression (4). The camera pose estimation unit 130 calculates a camera position and pose matrix M such that the sum of squares E presented in expression (4) is the smallest, and thereby obtains the position and pose of a camera. The camera pose estimation unit 130 outputs information of the position and pose of the camera 50 and information of the number of matched pairs to the quality determination unit 140.

The quality determination unit 140 is a processing unit that determines quality of the position and pose of the camera 50 that has been estimated by the camera pose estimation unit 130. For example, the quality determination unit 140 calculates the ratio of the number of matched pairs to the total number of map points included in the three-dimensional map. When the calculated ratio is equal to or higher than a predetermined ratio, the quality determination unit 140 determines that the estimated value of the position and pose of the camera 50 is high quality. By contrast, when the calculated ratio is lower than the predetermined ratio, the quality determination unit 140 determines that the estimated value of the position and pose of the camera 50 is low quality. For example, the predetermined ratio is 30%, for example.

When the quality determination unit 140 has determined that the estimated value of the position and pose of the camera 50 is high quality, the quality determination unit 140 determines that the position and pose of the camera 50 at the current time is the position and pose estimated by the camera pose estimation unit 130 and stores the position and pose thus determined in a predetermined storing unit.

When the quality determination unit 140 has determined that the estimated value of the position and pose of the camera 50 is low quality, the quality determination unit 140 outputs a relocalization processing request to the preprocessing unit 150.

The preprocessing unit 150 is a processing unit that, upon acquiring the relocalization processing request from the quality determination unit 140, compares the captured image at the current time and the keyframe table illustrated in FIG. 3 and searches for a reference keyframe. The preprocessing unit 150 outputs information of the reference keyframe to the determination unit 160.

The preprocessing unit 150 compares the captured image at the current time and the keyframe table and identifies a keyframe including a captured image the most similar to the captured image at the current time as the reference keyframe. The preprocessing unit 150 outputs information of the reference keyframe to the first relocalization processing unit 170 and the determination unit 160.

At this point, an example of the processing performed by the preprocessing unit 150 to search for the keyframe including a captured image the most similar to the captured image at the current time will be described. The preprocessing unit 150 reduces the current captured image and the captured image of each keyframe to a predetermined size, and with each of these images blurred by a Gaussian filter, calculates a sum of squared distance (SSD) for each pixel, and identifies a keyframe the SSD value of which is the smallest as the reference keyframe.

The determination unit 160 is a processing unit that determines which of the image-to-image method or the image-to-map method is to be used for performing relocalization processing. When the determination unit 160 has determined that the image-to-image method is used to perform relocalization processing, the determination unit 160 makes a relocalization processing request to the first relocalization processing unit 170. When the determination unit 160 has determined that the image-to-map method is used to perform relocalization processing, the determination unit 160 makes a relocalization processing request to the second relocalization processing unit 180. In the description below, processing performed by the determination unit 160 will be specifically described.

The determination unit 160 first determines whether or not a translational component is included in the positional relation between the position of the camera 50 of the reference keyframe and the current position of the camera 50. When a translational component is included in the positional relation, the determination unit 160 determines that relocalization processing is to be performed by the image-to-map method.

When no translational component is included in the positional relation, the determination unit 160 determines whether or not a rotation around the optical axis of the camera 50 is included. When a rotation around the optical axis is included, the determination unit 160 determines that relocalization processing is to be performed by the image-to-map method. When no translational component is included and no rotation around the optical axis is included in the positional relation, the determination unit 160 determines that relocalization processing is to be performed by the image-to-image method.

At this point, an example of the processing for determining whether or not a translational component is included in the positional relation will be described. The determination unit 160 uses an index referred to as geometric robust information criteria (GRIC) to determine whether or not a translational component is included in the positional relation. Processing related to the GRIC is described in P. H. S. Torr et al., "The Problem of Degeneracy in Structure and Motion Recovery from Uncalibrated Image Sequences", *International Journal of Computer Vision*, Vol. 32, No. 1, pp. 27-44, 1999.

The GRIC is a type of information criterion and an index for evaluating the conformity of a geometric model. A specific calculation expression for calculating the GRIC is presented by expression (9). In expression (9), I represents the number of corresponding points. $e_i$ represents an error between a corresponding point i and ideal coordinates calculated based on an obtained model. $\sigma$ represents a standard deviation of an error. $\rho(e^2_i)$ is presented by expression (10). $\lambda_1$ and $\lambda_2$ presented by expression (9) and $\lambda_3$ presented by expression (10) are presented by expression (11). ln represents a natural logarithm.

$$GRIC = \sum_{i=1}^{I} \rho(e_i^2) = \lambda_1 mI + \lambda_2 k \tag{9}$$

$$\rho(e_i^2) = \min\left(\frac{e^2}{\sigma^2}, \lambda_3(r-m)\right) \tag{10}$$

$$\lambda_1 = \ln 4, \lambda_2 = \ln 4I, \lambda_3 = 2 \tag{11}$$

At this point, the relation between the two images of the captured image of the reference keyframe and the current captured image may be explained by a fundamental matrix F and a homography matrix H because of the positional relation of the camera. For example, when only an on-the-spot rotation is included in the motion, the homography matrix H is used. When a translational movement is included in the motion, the fundamental matrix F is used.

In a model of the fundamental matrix F, the values of m, k, and r in expressions (9) and (10) are to be those presented in expression (12). In a model of the homography matrix H, the values of m, k, and r are to be those presented in expression (13).

$$(m,k,r)=(3,7,4) \tag{12}$$

$$(m,k,r)=(2,8,4) \tag{13}$$

The determination unit 160 compares GRIC scores based on the homography matrix and GRIC scores based on the fundamental matrix between the current captured image and the captured image of the reference keyframe, and thereby determines whether or not a translational component is included. The GRIC score based on the homography matrix is denoted as GRIC_H as appropriate. The GRIC score based on the fundamental matrix is denoted as GRIC_F as appropriate. Specific determination processing performed by the determination unit 160 will be described below.

The determination unit 160 calculates the feature points and the feature descriptors in the current captured image and the captured image of the reference keyframe and calculates the corresponding points. The processing performed by the determination unit 160 to extract the feature points from the current captured image and the captured image of the reference keyframe is the same as the processing performed by the feature point extraction unit 120 to extract the feature points.

For the processing performed by the determination unit 160 to match the feature points of the current captured image and the feature points of the captured image of the reference keyframe to calculate the corresponding points, the processing corresponding to the camera pose estimation unit 130 is performed. For example, the determination unit 160 calculates the inter-vector distance with respect to each of a first feature point of the current captured image and a second feature point of the captured image of the reference keyframe and identifies a pair of the first feature point and the second feature point with which the inter-vector distance is the smallest as the corresponding point.

After calculating the corresponding point, the determination unit 160 calculates the fundamental matrix F and the homography matrix H by using the calculated corresponding point. For example, the determination unit 160 calculates the fundamental matrix F based on the above-described 8-point algorithm. The determination unit 160 calculates the homography matrix H by using methods such as a DLT method and a RANSAC method. For the RANSAC method, the technique described in R. Hartley et al., *Multiple View Geometry in Computer Vision*, Cambridge University Press, Cambridge, U. K., 2000 may be used, for example.

The determination unit 160 projects the first feature point on the captured image of the reference keyframe by using the fundamental matrix F and identifies the error between the projected point and the second feature point as the value of e in the case of obtaining the GRIC_F. The determination unit 160 calculates the value of e for each of the corresponding points. The determination unit 160 calculates the value of the GRIC_F based on each of the obtained values of e and expressions (9) to (11) and (12).

The determination unit 160 projects the first feature point on the captured image of the reference keyframe by using the homography matrix H and identifies the error between the projected point and the second feature point as the value of e in the case of obtaining the GRIC_H. The determination unit 160 calculates the value of e for each of the corresponding points. The determination unit 160 calculates the value of the GRIC_H based on each of the obtained values of e and expressions (9) to (11) and (13).

The determination unit 160 compares the value of GRIC_F and the value of the GRIC_H. When the value of GRIC_H is larger than the value of the GRIC_F, the determination unit 160 determines that a translational component is included. If a translational component is included, it is indicated that the current camera 50 has performed translational movement with respect to the previous position of the camera 50. When the value of GRIC_H is not larger than the value of the GRIC_F, the determination unit 160 determines that no translation component is included.

Next, it is determined whether or not a rotation around the optical axis of the camera 50 is included. For example, the determination unit 160 obtains a rotation angle with respect to each axis from a rotation matrix and, when the rotation angles around two axes perpendicular to the optical axis do not exceed a prescribed value, determines that the rotation of the camera 50 only includes rotation around the optical axis. Specific determination processing performed by the determination unit 160 will be described below.

The determination unit 160 prepares two virtual points between the captured image of the reference keyframe and the current captured image and calculates the homography matrix H with respect to the virtual point. The determination unit 160 uses methods such as the DLT method and the RANSAC method to calculate the homography matrix H. For example, the virtual point on the current captured image is set to a first virtual point and the virtual point on the captured image of the reference keyframe is set to a second virtual point.

The determination unit 160 uses a Gauss-Newton method to estimate the rotation matrix R' of the camera such that a virtual point which is the projection of the first virtual point that has been projected on the captured image of the reference keyframe using the homography matrix H comes close to the second virtual point. The rotation matrix R' is a matrix of 3 rows×3 columns.

The determination unit 160 calculates angles $A_x$ and $A_y$ around the axis perpendicular to the optical axis based on expressions (14) and (15) respectively.

$$A_x = \sin^{-1} R'_{32} \tag{14}$$

$$A_y = \tan^{-1} \frac{R'_{31}}{R'_{33}} \tag{15}$$

When the angles $A_x$ and $A_y$ both are less than a predetermined threshold, the determination unit 160 determines that no rotation around the optical axis is included. When either one of the angles $A_x$ and $A_y$ is equal to or higher than the predetermined threshold, the determination unit 160 determines that a rotation around the optical axis is included.

The first relocalization processing unit 170 is a processing unit that, upon receiving a relocalization processing request from the determination unit 160, estimates the position and pose of the camera 50 based on the image-to-image method. The first relocalization processing unit 170 estimates the current position and pose of the camera 50 from the correspondence relation between the captured image of the reference keyframe and the current captured image.

For example, the first relocalization processing unit 170 uses expressions (6), (16), and (17) to convert the position and pose of the camera included in the reference keyframe into an pose matrix $P_k$ of 4 rows×4 columns by using Rodrigues' conversion.

$$t = \begin{pmatrix} t_1 \\ t_2 \\ t_3 \end{pmatrix} \tag{16}$$

$$P_k = \begin{pmatrix} R & t \\ 0 & 1 \end{pmatrix} \tag{17}$$

The first relocalization processing unit 170 uses the rotation matrix R' of the camera to calculate the position and pose matrix $P_n$ of the current camera by using expression (18). Furthermore, the first relocalization processing unit 170 may calculate an pose vector of the current camera 50 by using Rodrigues' conversion presented in expression (19).

$$P_n = \begin{pmatrix} R' & 0 \\ 0 & 1 \end{pmatrix} P_k \tag{18}$$

$$\sin\theta * \begin{bmatrix} 0 & -r_3 & r_2 \\ r_3 & 0 & -r_1 \\ -r_2 & r_1 & 0 \end{bmatrix} = \frac{R - R^T}{2} \tag{19}$$

The second relocalization processing unit 180 is a processing unit that, upon receiving a relocalization processing request from the determination unit 160, estimates the position and pose of the camera 50 based on the image-tomap method. The second relocalization processing unit 180 estimates the position and pose of the camera 50 based on the feature points of the current captured image and the three-dimensional map.

For example, the second relocalization processing unit 180 performs matching of the feature points of the current captured image and the map points. The second relocalization processing unit 180 may use the result from the matching performed by the determination unit 160 or perform processing that is the same as the processing performed by the determination unit 160.

FIG. 5 is a diagram illustrating an example of a matching result. Explanation of a number, X, Y, Z, and a feature descriptor illustrated in FIG. 5 is the same as that described with reference to FIG. 2. x, y represent two-dimensional coordinates of the feature points to be paired with the map points. The second relocalization processing unit 180 uses a pair of the map points and the feature points illustrated in FIG. 5 to estimate the position and pose of the camera by using the PnP algorithm.

Figure 6:
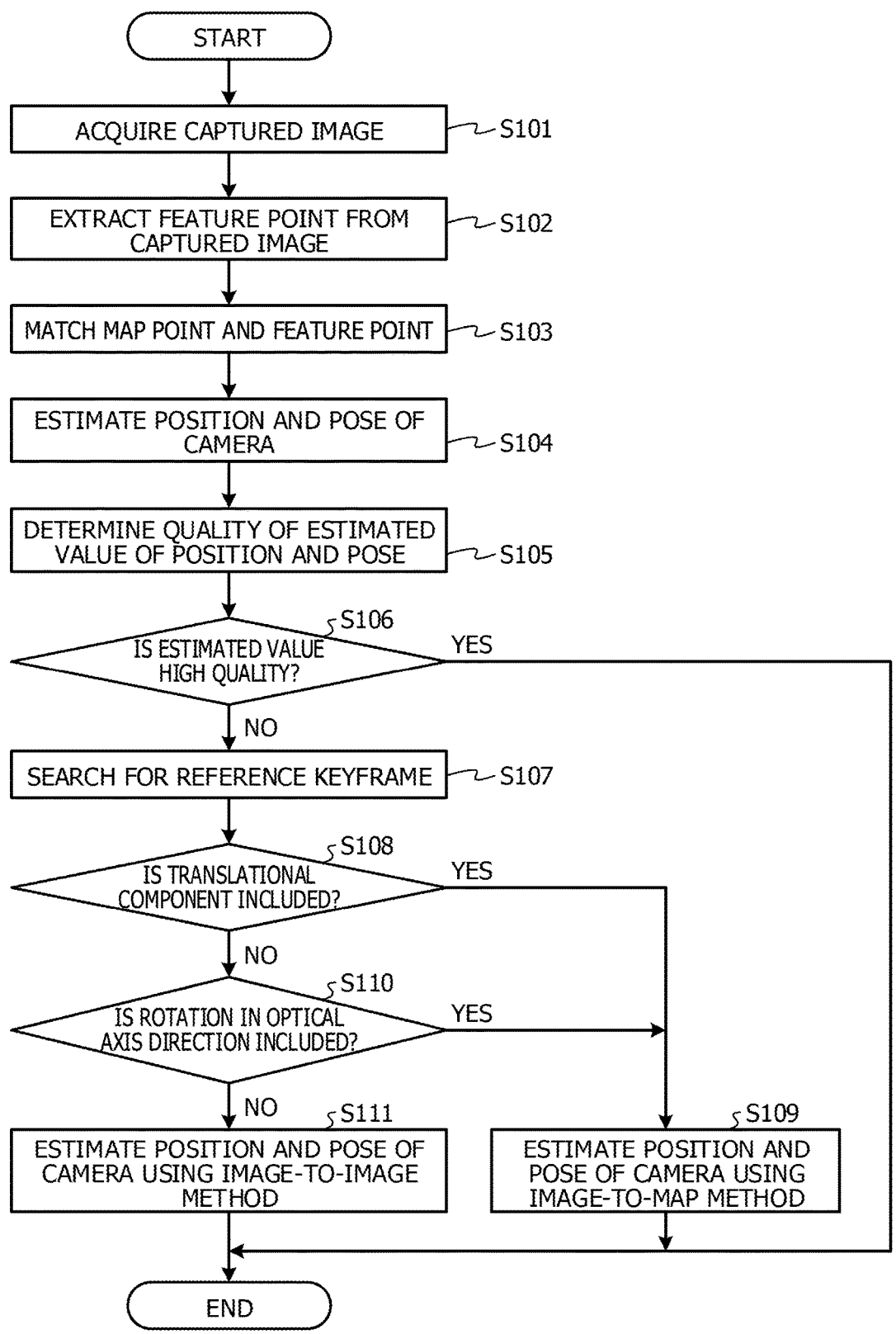
FIG. 6 is a flow chart illustrating a procedure of processing performed by a camera pose estimation device according to a first embodiment.

Next, a procedure of processing performed by the camera pose estimation device 100 according to the first embodiment will be described. FIG. 6 is a flow chart illustrating a procedure of processing performed by a camera pose estimation device according to the first embodiment. As illustrated in FIG. 6, the image acquisition unit 110 of the camera pose estimation device 100 acquires a captured image from the camera 50 (step S101).

The feature point extraction unit 120 of the camera pose estimation device 100 extracts feature points from the captured image (step S102). The camera pose estimation unit 130 of the camera pose estimation device 100 performs matching of the map points and the feature points (step S103) and estimate the position and pose of the camera (step S104).

The quality determination unit 140 of the camera pose estimation device 100 determines the quality of the estimated value of the position and pose of the camera (step S105). When the estimated value is high quality (Yes at step S106), the quality determination unit 140 ends the processing. For example, when the estimated value is determined as high quality at step S106, the camera pose estimation device 100 determines the position and pose of the camera 50 estimated by the camera pose estimation unit 130 as the current position and pose of the camera.

By contrast, when the quality determination unit 140 has determined that the estimated value is not high quality (No at step S106), the processing proceeds to step S107. The preprocessing unit 150 of the camera pose estimation device 100 searches for the reference keyframe (step S107).

The determination unit 160 of the camera pose estimation device 100 determines whether or not a translational component is included (step S108). When the determination unit 160 has determined that a translational component is included (Yes at step S108), the processing proceeds to step S109. The second relocalization processing unit 180 of the camera pose estimation device 100 uses the image-to-map method to estimate the position and pose of the camera 50 (step S109).

By contrast, when the determination unit 160 has determined that no translational component is included (No at step S108), the determination unit 160 determines whether or not a rotation in the optical axis direction is included (step S110). When the determination unit 160 has determined that a rotation in the optical axis direction is included (Yes at step S110), the processing proceeds to step S109.

When the determination unit 160 has determined that no rotation in the optical axis direction is included (No at step S110), the processing proceeds to step S111. The first relocalization processing unit 170 of the camera pose estimation device 100 uses the image-to-image method to estimate the position and pose of the camera 50 (step S111).

Next, an effect of the camera pose estimation device 100 according to the first embodiment will be described. The camera pose estimation device 100 determines whether or not the camera motion includes a translational movement, and if the camera motion includes a translational movement, selects the image-to-map method to perform relocalization processing. The camera pose estimation device 100, if the camera motion does not include a translational movement, determines around what direction the on-the-spot rotation is mainly performed, and if the on-the-spot rotation is performed around the optical axis, uses the image-to-map method to perform relocalization processing. In other cases, the camera pose estimation device 100 uses the image-to-image method to perform relocalization processing. With this, regardless of the positional relation between the position of the camera before the movement and that after the movement, the camera pose estimation device 100 is able to accurately estimate the position and pose of the camera and perform appropriate relocalization processing.

Second Embodiment

In a second embodiment, an embodiment related to relocalization processing based on a marker having a predetermined shape will be described. A camera pose estimation device according to the second embodiment, upon detecting a marker from the captured image of the camera, uses the detected marker to estimate the position and pose of the camera. The marker is hard to be incorrectly recognized compared with other objects and thus enables improvement in estimation accuracy of the position and pose of the camera 50, compared with the image-to-image method and the image-to-map method.

Figure 7:
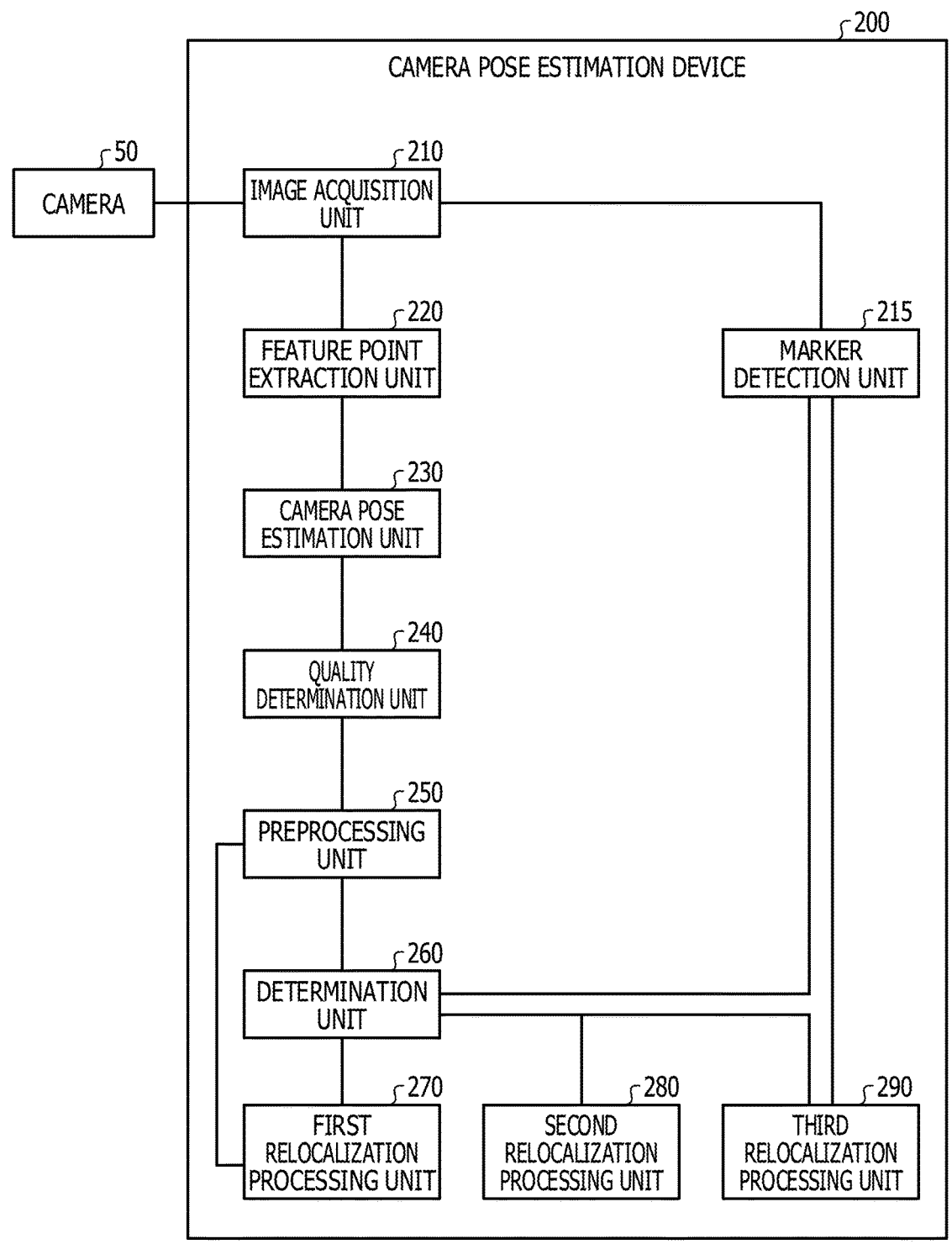
FIG. 7 is a diagram illustrating a configuration of a camera pose estimation device according to a second embodiment.

FIG. 7 is a diagram illustrating a configuration of a camera pose estimation device according to a second embodiment. As illustrated in FIG. 7, this camera pose estimation device 200 is connected to the camera 50. The camera pose estimation device 200 includes an image acquisition unit 210, a marker detection unit 215, a feature point extraction unit 220, a camera pose estimation unit 230, and a quality determination unit 240. The camera pose estimation device 200 further includes a preprocessing unit 250, a determination unit 260, a first relocalization processing unit 270, a second relocalization processing unit 280, and a third relocalization processing unit 290.

The image acquisition unit 210 is a processing unit that is connected to the camera 50 to acquire a captured image from the camera 50. The image acquisition unit 210 outputs the captured image to the feature point extraction unit 220 and the marker detection unit 215.

The marker detection unit 215 is a processing unit that detects the marker from the captured image. When the marker detection unit 215 detects the marker from the captured image, the marker detection unit 215 outputs information indicating that the marker detection unit 215 has detected the marker to the determination unit 260. Furthermore, the marker detection unit 215 outputs the captured image including the marker to the third relocalization processing unit 290.

Figure 8:
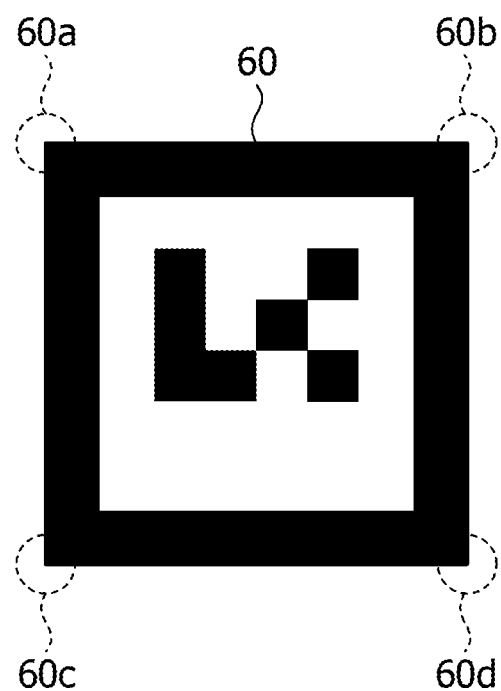
FIG. 8 is a diagram illustrating an example of a target marker in the second embodiment.

FIG. 8 is a diagram illustrating an example of a target marker in the second embodiment. As illustrated in FIG. 8, a marker 60 has a rectangular shape and a pattern for identifying the ID of the marker 60 printed inside the rectangle. For example, the marker detection unit 215 may use the technique described in H. Kato et al., "*Marker Tracking and HMD Calibration for a Video-based Augmented Reality Conferencing System*", IWAR, pp. 85-94, 1999.

The marker detection unit 215 performs the processing described below and thereby detects coordinates of four corners 60a, 60b, 60c, and 60d of the marker 60 on the image. The marker detection unit 215 binarizes the captured image to black and white. The marker detection unit 215 performs labelling on the captured image thus binarized and extracts the outline thereof. The marker detection unit 215 extracts a quadrangle having four corners from the outline. The marker detection unit 215 performs template matching between the extracted quadrangle and a predetermined pattern and detects a quadrangle coincided with the predetermined pattern as the marker.

The explanation of the feature point extraction unit 220, the camera pose estimation unit 230, the quality determination unit 240, and the preprocessing unit 250 is the same as that of the feature point extraction unit 120, the camera pose estimation unit 130, the quality determination unit 140, and the preprocessing unit 150 illustrated in FIG. 4. The explanation of the first relocalization processing unit 270 and the second relocalization processing unit 280 is the same as that of the first relocalization processing unit 170 and the second relocalization processing unit 180 illustrated in FIG. 4.

The determination unit 260 is a processing unit that determines what is used for performing relocalization processing out of the image-to-image method, the image-to-map method, and the marker. When the determination unit 260 has received from the marker detection unit 215 information indicating that the marker detection unit 215 has detected the marker, the determination unit 260 makes a relocalization processing request to the third relocalization processing unit 290. Other processing related to the determination unit 260 is the same as that related to the determination unit 160 illustrated in FIG. 4.

The third relocalization processing unit 290 is a processing unit that, upon receiving a relocalization processing request from the determination unit 260, estimates the position and pose of the camera 50 using the marker. For example, the third relocalization processing unit 290 may use any conventional technique that estimates the position and pose of the camera 50 based on the marker. In the description below, an example of processing performed by the third relocalization processing unit 290 will be described. For example, the third relocalization processing unit 290 sequentially performs estimation of a rotation matrix R, estimation of a translational movement component, and vectorization of a rotation movement component, and thereby estimates the position and pose of the camera 50.

Processing for estimating a rotation matrix R of 3 rows×3 columns will be described. The third relocalization processing unit 290 performs the same processing as that performed by the marker detection unit 215 and detects four corners of the maker included in the captured image. The third relocalization processing unit 290 calculates direction vectors $V_1$, $V_2$ including the marker from the four corners of the marker. The third relocalization processing unit 290 calculates a unit vector $V_3$ orthogonal to $V_1$, $V_2$. The rotation matrix R may be represented by expression (20).

$$R = [V_1, V_2, V_3] \quad (20)$$

Processing for estimating a translational movement component of 3 rows×1 column will be described. The third relocalization processing unit 290 substitutes the rotation matrix R in expression (21) and (22) and thereby obtains a simultaneous equation related to $W_1$, $W_2$, $W_3$. The third relocalization processing unit 290 solves the simultaneous equation by a least-squares method and thereby obtains translational movement components of 3 rows×1 column $[W_1, W_2, W_3]$. For example, the third relocalization processing unit 290 uses the technique described in the above-mentioned non-patent literature by H. Kato to obtain the translational movement components.

$$\begin{bmatrix} X_c \\ Y_c \\ Z_c \\ 1 \end{bmatrix} = \begin{bmatrix} V_{11} & V_{12} & V_{13} & W_x \\ V_{21} & V_{22} & V_{23} & W_y \\ V_{31} & V_{32} & V_{33} & W_z \\ 0 & 0 & 0 & 1 \end{bmatrix} \begin{bmatrix} X_m \\ Y_m \\ Z_m \\ 1 \end{bmatrix} \quad (21)$$

$$= \begin{bmatrix} V_{3\times 3} & V_{3\times 1} \\ 0 \ 0 \ 0 & 1 \end{bmatrix} \begin{bmatrix} X_m \\ Y_m \\ Z_m \\ 1 \end{bmatrix}$$

$$= T_{cm} \begin{bmatrix} X_m \\ Y_m \\ Z_m \\ 1 \end{bmatrix}$$

$$P = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix}, \begin{bmatrix} hx_C \\ hy_C \\ h \\ 1 \end{bmatrix} = P \begin{bmatrix} X_c \\ Y_c \\ Z_c \\ 1 \end{bmatrix} \quad (22)$$

Vectorization of a rotation movement component will be described. The third relocalization processing unit 290 converts the rotation matrix of 3 rows×3 columns into a three-dimensional vector r based on expression (6). The third relocalization processing unit 290 estimates the above-described translational movement components $[W_1, W_2, W_3]$ and the vector r as the position and pose of the camera 50.

Figure 9:
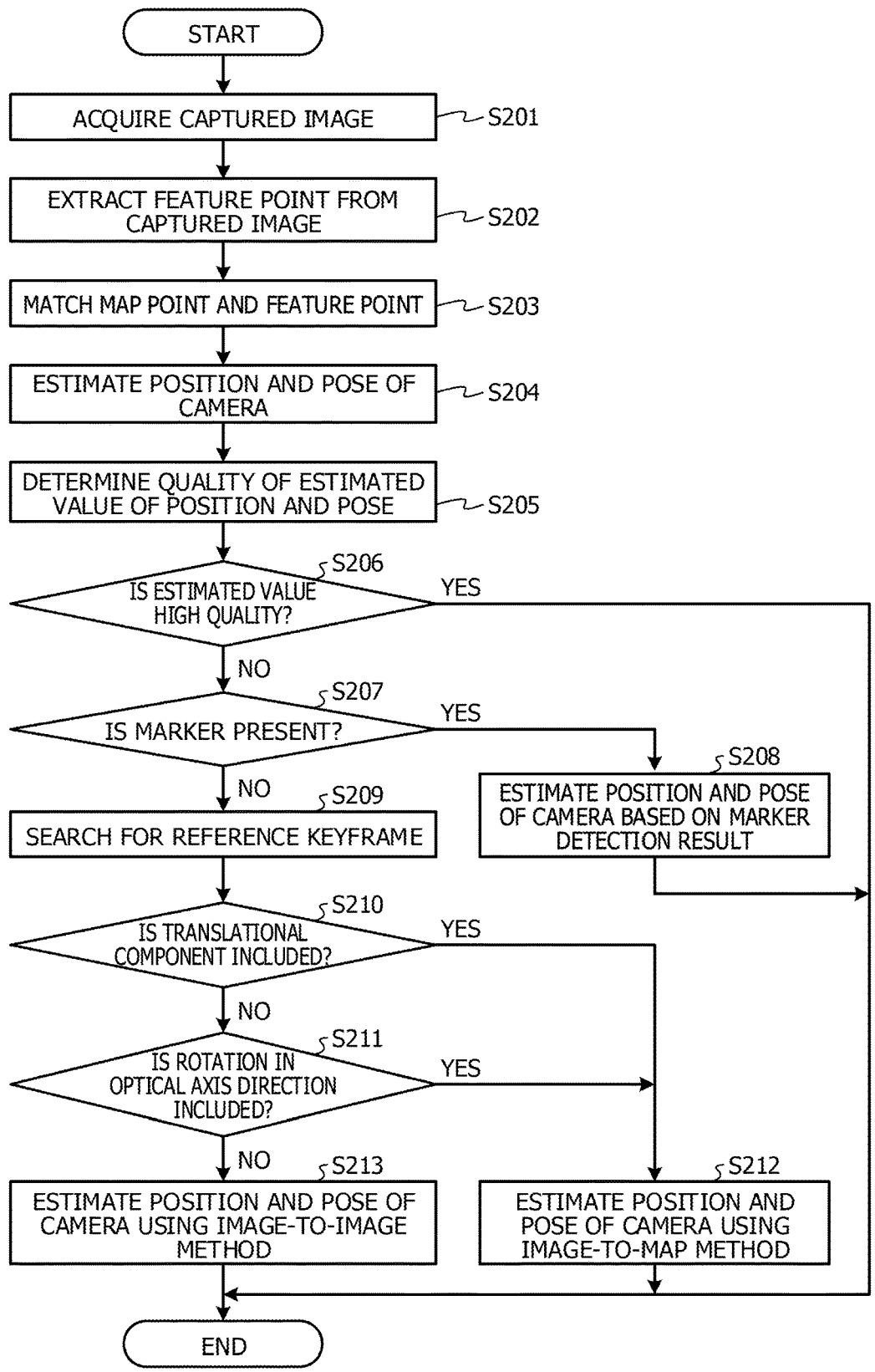
FIG. 9 is a flow chart illustrating a procedure of processing performed by a camera pose estimation device according to the second embodiment.

Next, a procedure of processing performed by the camera pose estimation device 200 according to the second embodiment will be described. FIG. 9 is a flow chart illustrating a procedure of processing performed by a camera pose estimation device according to the second embodiment. As illustrated in FIG. 9, the image acquisition unit 210 of the camera pose estimation device 200 acquires a captured image from the camera 50 (step S201).

The feature point extraction unit 220 of the camera pose estimation device 200 extracts a feature point from the captured image (step S202). The camera pose estimation unit 230 of the camera pose estimation device 200 performs matching of map points and feature points (step S203) and estimates the position and pose of the camera (step S204).

The quality determination unit 240 of the camera pose estimation device 200 determines quality of the estimated value of the position and pose of the camera (step S205). When the estimated value is high quality (Yes at step S206), the quality determination unit 240 ends the processing. For example, when the quality determination unit 240 has determined that the estimated value is high quality at step S206, the camera pose estimation device 200 determines the position and pose of the camera 50 estimated by the camera pose estimation unit 230 as the current position and pose of the camera.

By contrast, when the quality determination unit 240 has determined that the estimated value is not high quality (No at step S206), the processing proceeds to step S207. The marker detection unit 215 of the camera pose estimation device 200, when a marker is present (Yes at step S207), moves to step S208, and when no marker is present (No at step S207), moves to step S209. The preprocessing unit 250 of the camera pose estimation device 200 searches for a reference keyframe (step S209).

At step S208, the camera pose estimation device 200 estimates the position and pose of the camera based on the detection result of the marker (step S208).

The determination unit 260 of the camera pose estimation device 200 determines whether or not a translational component is included (step S210). When the determination unit 260 has determined that a translational component is included (Yes at step S210), the processing proceeds to step S212. The second relocalization processing unit 280 of the camera pose estimation device 200 uses the image-to-map method to estimate the position and pose of the camera 50 (step S212).

By contrast, when the determination unit 260 has determined that no translational component is included (No at step S210), the determination unit 260 determines whether or not a rotation in the optical axis direction is included (step S211). When the determination unit 260 has determined that a rotation in the optical axis direction is included (Yes at step S211), the processing proceeds to step S212.

When the determination unit 260 has determined that no rotation in the optical axis direction is included (No at step S211), the processing proceeds to step S213. The first relocalization processing unit 270 of the camera pose estimation device 200 uses the image-to-image method to estimate the position and pose of the camera 50 (step S213).

Next, an effect of the camera pose estimation device 200 according to the second embodiment will be described. The camera pose estimation device 200, upon detecting a marker from the captured image of the camera, uses the detected marker to estimate the position and pose of the camera. The marker is hard to be incorrectly recognized compared with other objects and thus enables improvement in estimation accuracy of the position and pose of the camera 50, compared with the image-to-image method and the image-to-map method.

Next, other embodiment will be described. In the first and the second embodiments, the quality determination units 140 and 240 determine the quality of the pose estimation, whereby whether or not relocalization processing is performed is determined. However, there also is a case where, even when the estimated value is equal to or lower than a threshold, the camera pose estimation itself is successful. If relocalization processing is performed and an erroneous relocalization result is applied in the above-describe case, the position and pose of the camera may be lost in that state. For example, if a feature point has erroneous correspondence, an error is generated in the estimation result of the relocalization processing. For this reason, the camera pose estimation devices 100 and 200 may further determine validity of the position and pose identified by the relocalization processing.

Other embodiment will now be described by using the camera pose estimation device 100 illustrated in FIG. 4. The quality determination unit 140 holds therein in advance the position and pose of the camera 50 as the result of relocalization at the previous time and the position and pose of the camera 50 in a case where relocalization processing has not been performed. The quality determination unit 140 then uses the position and pose in both cases described above to perform the matching and the camera position and pose estimation, and thereby determines the quality. The quality determination unit 140 performs the subsequent processing by using the result of the matching and the position and pose estimation of the camera 50 from the case having created the higher estimated value of the position and pose.

Figure 10:
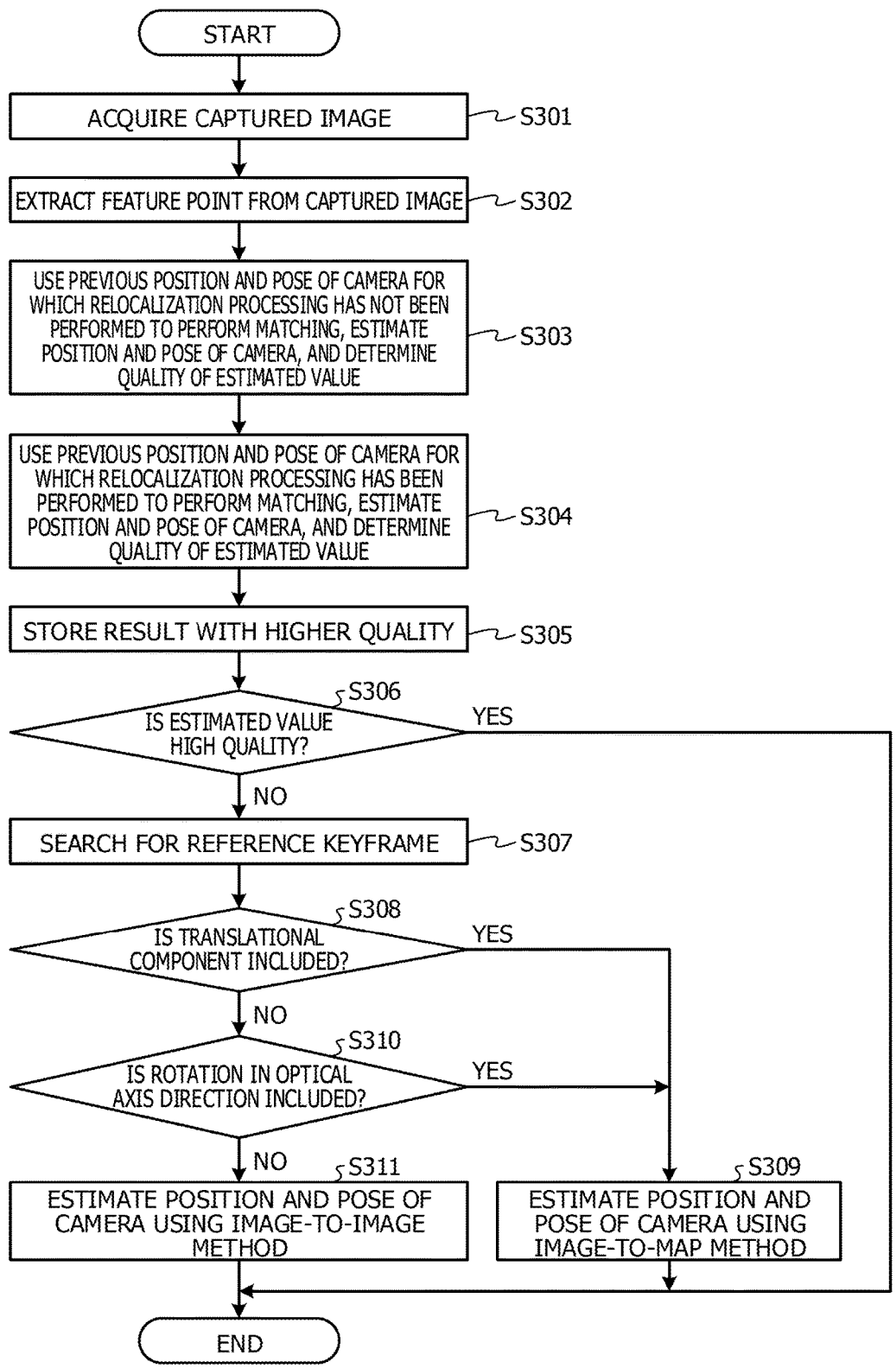
FIG. 10 is a flow chart illustrating a procedure of processing performed by a camera pose estimation device according to other embodiment.

FIG. 10 is a flow chart illustrating a procedure of processing performed by a camera pose estimation device according to other embodiment. It is noted that before the processing illustrated in FIG. 10 is performed, the processing explained with reference to FIG. 6 has been performed at least once. As illustrated in FIG. 10, the image acquisition unit 110 of the camera pose estimation device 100 acquires a captured image from the camera 50 (step S301).

The feature point extraction unit 120 of the camera pose estimation device 100 extracts a feature point from the captured image (step S302). The camera pose estimation unit 130 of the camera pose estimation device 100 uses the position and pose of the camera at the last time for which relocalization processing has not been performed to perform matching and estimate the position and pose of the camera, and thereby determines quality of the estimated value (step S303).

The camera pose estimation unit 130 of the camera pose estimation device 100 uses the position and pose of the camera at the last time for which relocalization processing has been performed to perform matching and estimate the position and pose of the camera, and thereby determines quality of the estimated value (step S304). The quality determination unit 140 of the camera pose estimation device 100 causes the result with higher quality to be stored (step S305).

When the estimated value is high quality (Yes at step S306), the quality determination unit 140 ends the processing. For example, when the camera pose estimation device 100 has determined that the estimated value is high quality at step S306, the camera pose estimation device 100 determines the position and pose of the camera 50 stored at step S305 as the current position and pose of the camera.

By contrast, when the quality determination unit 140 has determined that the estimated value is not high quality (No at step S306), the processing proceeds to step S307. The preprocessing unit 150 of the camera pose estimation device 100 searches for a reference keyframe (step S307).

The determination unit 160 of the camera pose estimation device 100 determines whether or not a translational component is included (step S308). When the determination unit 160 has determined that a translational component is included (Yes at step S308), the processing proceeds to step S309. The second relocalization processing unit 180 of the camera pose estimation device 100 uses the image-to-map method to estimate the position and pose of the camera 50 (step S309).

By contrast, when the determination unit 160 has determined that no translational component is included (No at step S308), the determination unit 160 determines whether or not a rotation in the optical axis direction is included (step S310). When the determination unit 160 has determined that a rotation in the optical axis direction is included (Yes at step S310), the processing proceeds to step S309.

When the determination unit 160 has determined that no rotation in the optical axis direction is included (No at step S310), the processing proceeds to step S311. The first relocalization processing unit 170 of the camera pose estimation device 100 uses the image-to-image method to estimate the position and pose of the camera 50 (step S311).

As illustrated in FIG. 10, the camera pose estimation device 100 evaluates the position and pose of the camera 50 for which relocalization processing has been performed and the position and pose of the camera 50 for which relocalization processing has not been performed, and uses the one with the better evaluation result to continue the processing. This enables improvement in estimation accuracy of the position and pose of the camera even when an error is generated in the estimation result with relocalization processing.

Next, other embodiment using the image-to-map method described in the first and the second embodiments will be described. For example, the PnP algorithm used by the second relocalization processing unit 180, in general, roughly calculates an initial estimated value of the camera pose based on the DLT method and then determines a final pose value using an iterative method such as a Levenberg-Marquardt method.

Figure 11:
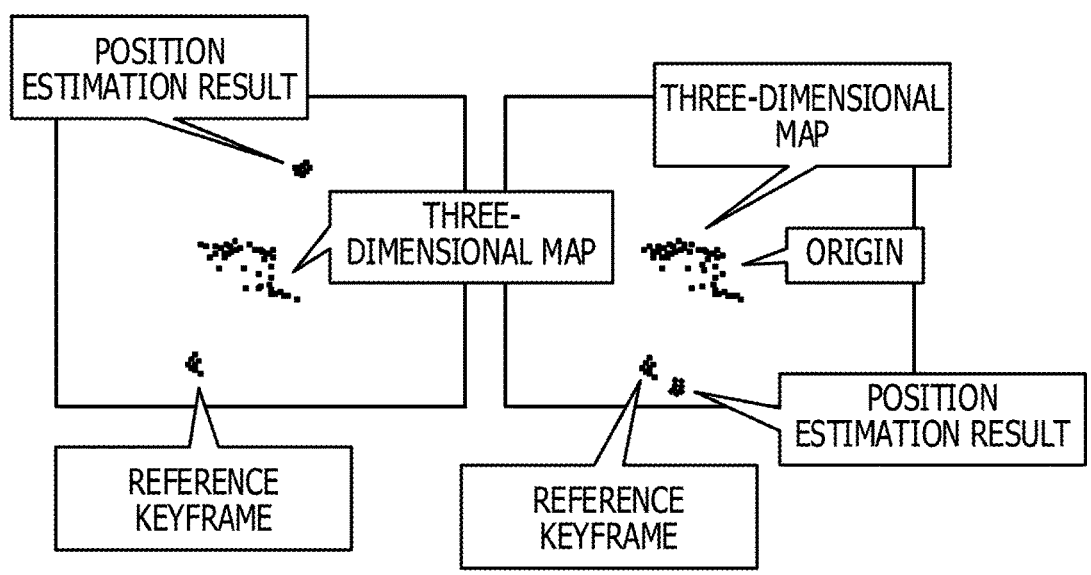
FIG. 11 is a diagram illustrating a problem in initial position estimation based on a DLT method.

However, when the first embodiment is applied, depending on the generation state of erroneous correspondence in feature point matching, the initial position estimation based on the DLT method causes a result deviated from an ideal value. FIG. 11 is a diagram illustrating a problem in initial position estimation based on a DLT method. The left figure in FIG. 11 illustrates a state in which a problem occurs and illustrates a three-dimensional map, a keyframe, and a camera position estimation result. The position estimation result is obtained in the rear of the map whereas the camera position estimation result originally has to be obtained in a position near the keyframe.

For this reason, the second relocalization processing unit 180 sets the initial camera pose value by the PnP algorithm to the camera pose value of the reference keyframe. The result added with the above-described improvement is illustrated in the right figure in FIG. 11. With the second relocalization processing unit 180 using this initial value, the estimation result is obtained in a position near the keyframe, whereby the estimation accuracy of the position and pose is improved.

Figure 12:
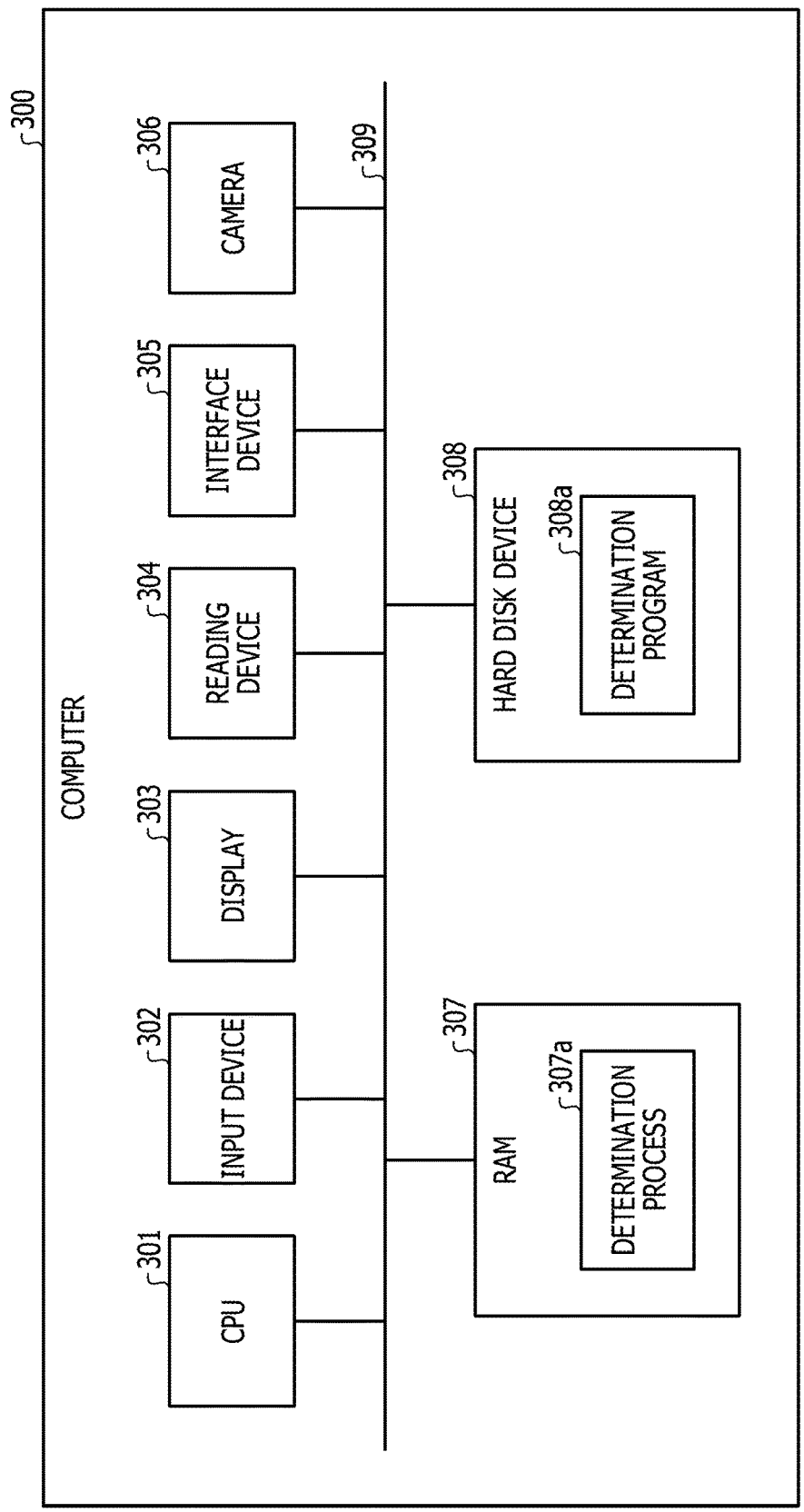
FIG. 12 is a diagram illustrating an example of a computer executing a camera pose estimation program.

Next, an example of a computer will be described that executes a camera pose estimation program implementing the same function as those of the camera pose estimation devices 100 and 200 described in the embodiments described above. FIG. 12 is a diagram illustrating an example of a computer executing a camera pose estimation program.

As illustrated in FIG. 12, a computer 300 includes a CPU 301 that performs various calculation processing, an input device 302 that receives a data input from the user, and a display 303. Furthermore, the computer 300 includes a reading device 304 that reads a program, for example, from a recording medium, an interface device 305 that transmits and receives data to and from other computer via a network, and a camera 306. Furthermore, the computer 300 includes a RAM 307 that temporarily stores therein various information and a hard disk device 308. Each of the devices 301 to 308 is connected to a bus 309.

The hard disk device 308 includes a determination program 308a. The CPU 301 reads the determination program 308a and develops the read determination program 308a in the RAM 307. The determination program 308a functions as a determination process 307a. The processing of the determination process 307a corresponds to the processing performed by the determination units 160 and 260.

It is noted that the determination program 208a does not necessarily has to be stored in the hard disk device 308 from the start. For example, each program is stored in advance in a "portable physical medium" to be inserted into the computer 300, such as a flexible disk (FD), a CD-ROM, a DVD disk, a magneto-optical disk, and an IC card. The computer 300 may then read the determination program 308a and executes the read determination program 308a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method comprising:
   determining movement of a camera from a first time point when a first image has been captured to a second time point when a second image has been captured based on the first image and the second image captured by the camera;
   performing first estimation processing for estimating a position and pose of the camera in the second time point based on image data at a time of capturing the image data, a past image captured in the past, and a past position and pose of the camera at a time point when the past image has been captured, when the movement is not a translational movement and a rotation movement around an optical direction; and
   performing a second estimation processing for estimating the position and pose of the camera at the second time point based on a feature descriptor of a feature point extracted from the second image and a feature descriptor of a map point accumulated in the past, when the movement is the translational movement or the rotational movement around the optical direction.

2. The method according to claim 1, further comprising:
   performing a third estimation processing for estimating the position and pose of the camera using another method prior to the first estimation processing or the second estimation processing; and
   performing the first estimation processing or the second estimation processing when quality determined by the third estimation processing is lower than a threshold.

3. The method according to claim 2, further comprising:
   performing a fourth estimation processing for estimating the position and pose of the camera based on a marker when the quality determined by the third estimation processing is lower than a threshold and the marker, which has a predetermined shape, has been detected from the second image.

4. The method according to claim 1, wherein the first estimation processing is processing that uses an image-to-image method.

5. The method according to claim 1, wherein the second estimation processing is processing that uses an image-to-map method.

6. The method according to claim 1, further comprising:
   displaying additional information on the second image to be displayed on a display based on a result from the first estimation processing or the second estimation processing.

7. The method according to claim 6, wherein the additional information is an augmented reality content.

8. A device comprising:
a memory; and
a processor coupled to the memory and configured to:
- determine movement of a camera from a first time point when a first image has been captured to a second time point when a second image has been captured based on the first image and the second image captured by the camera,
- perform first estimation processing for estimating a position and pose of the camera in the second time point based on image data at a time of capturing the image data, a past image captured in the past, and a past position and pose of the camera at a time point when the past image has been captured, when the movement is not a translational movement and a rotation movement around an optical direction, and
- perform a second estimation processing for estimating the position and pose of the camera at the second time point based on a feature descriptor of a feature point extracted from the second image and a feature descriptor of a map point accumulated in the past, when the movement is the translational movement or the rotational movement around the optical direction.

9. The device according to claim 8, wherein the processor is configured to:
- perform a third estimation processing for estimating the position and pose of the camera using another method prior to the first estimation processing or the second estimation processing, and
- perform the first estimation processing or the second estimation processing when quality determined by the third estimation processing is lower than a threshold.

10. The device according to claim 9, wherein the processor is configured to perform a fourth estimation processing for estimating the position and pose of the camera based on a marker when the quality determined by the third estimation processing is lower than a threshold and the marker, which has a predetermined shape, has been detected from the second image.

11. The device according to claim 8, wherein the first estimation processing is processing that uses an image-to-image method.

12. The device according to claim 8, wherein the second estimation processing is processing that uses an image-to-map method.

13. The device according to claim 8, wherein the processor is configured to display additional information on the second image to be displayed on a display based on a result from the first estimation processing or the second estimation processing.

14. The device according to claim 13, wherein the additional information is an augmented reality content.

15. A non-transitory computer-readable storage medium storing a program for causing a computer to execute a process, the process comprising:
- determining movement of a camera from a first time point when a first image has been captured to a second time point when a second image has been captured based on the first image and the second image captured by the camera;
- performing first estimation processing for estimating a position and pose of the camera in the second time point based on image data at a time of capturing the image data, a past image captured in the past, and a past position and pose of the camera at a time point when the past image has been captured, when the movement is not a translational movement and a rotation movement around an optical direction; and
- performing a second estimation processing for estimating the position and pose of the camera at the second time point based on a feature descriptor of a feature point extracted from the second image and a feature descriptor of a map point accumulated in the past, when the movement is the translational movement or the rotational movement around the optical direction.

16. The non-transitory computer-readable storage medium according to claim 15, the process further comprising:
- performing a third estimation processing for estimating the position and pose of the camera using another method prior to the first estimation processing or the second estimation processing; and
- performing the first estimation processing or the second estimation processing when quality determined by the third estimation processing is lower than a threshold.

17. The non-transitory computer-readable storage medium according to claim 16, the process further comprising:
- performing a fourth estimation processing for estimating the position and pose of the camera based on a marker when the quality determined by the third estimation processing is lower than a threshold and the marker, which has a predetermined shape, has been detected from the second image.

18. The non-transitory computer-readable storage medium according to claim 15, wherein the first estimation processing is processing that uses an image-to-image method.

19. The non-transitory computer-readable storage medium according to claim 15, wherein the second estimation processing is processing that uses an image-to-map method.

20. The non-transitory computer-readable storage medium according to claim 15, the process further comprising:
- displaying additional information on the second image to be displayed on a display based on a result from the first estimation processing or the second estimation processing.

* * * * *